Dec. 19, 1961    B. H. JOHNSON    3,013,555
BABY SUPPORT
Filed Dec. 24, 1958
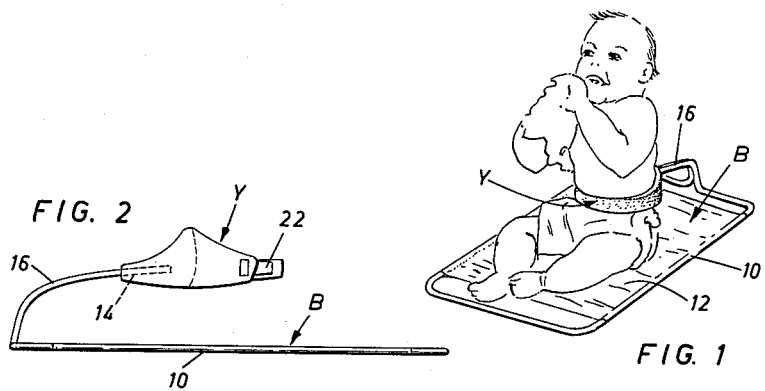
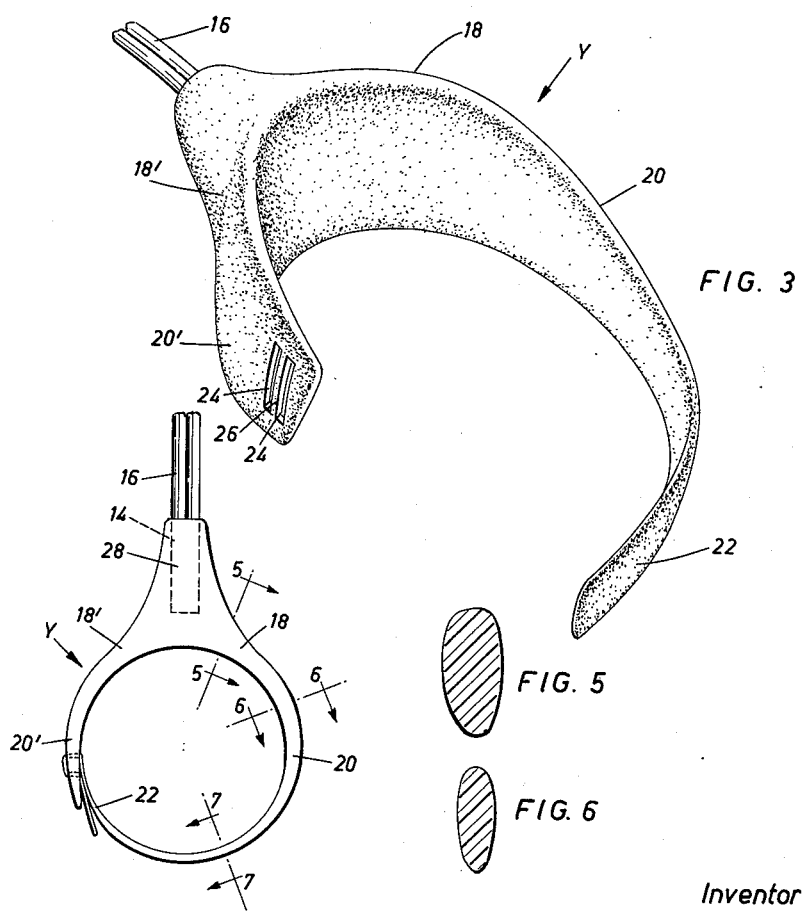
Inventor
BRUCE H. JOHNSON
Per: Leon Arthurs
Agent

United States Patent Office 3,013,555
Patented Dec. 19, 1961

3,013,555
BABY SUPPORT
Bruce Henderson Johnson, Toronto, Ontario, Canada
(4836 Grosvenor Ave., Montreal, Quebec, Canada)
Filed Dec. 24, 1958, Ser. No. 782,891
3 Claims. (Cl. 128—134)

The invention relates to a device for supporting and maintaining a baby in sitting position, and is of particular utility when it is desired to maintain a baby in such position in a bathtub.

Such devices as have been known heretofore have suffered from a variety of defects which need not be enumerated herein but which rendered such devices inconvenient or even harmful in use, and/or unduly expensive to manufacture. In particular, such devices tended to restrict access to the baby, whether for washing or any other analogous purpose.

Accordingly, the present invention has as a general aim the provision of such a support which is at once both safe and easy to use and economical to manufacture. More specifically, the invention seeks to provide a yoke for such a support for encircling the body of the baby, which holds the baby securely affording the maximum freedom of access for washing or otherwise, and in which the chance of injury to, or infection of the baby is reduced to a minimum. Still more specifically, the invention seeks to provide such a yoke, which is capable of fitting snugly round the body and in addition is resistant to undue constriction. Still more specifically the invention seeks to provide such a yoke having parts which are relatively rigid, parts which are progressively resiliently deformable and parts which are flexible and adapted to complete said yoke, the whole being made in one piece. Still further, the invention seeks to provide such a yoke characterized by a virtual absence of any sharp points or edges which are likely to injure the baby, and/or by the elimination of crevices which are likely to harbour infection.

As a further object the invention seeks to provide such a baby support in which the baby is located free from any obstructions other than such yoke. More specifically, the invention seeks to provide such a support having a gooseneck for locating said yoke at an elevation and orientation enhancing access to the baby for washing or otherwise.

A still further object of the invention is the provision of such baby support having a base adapted to prevent the baby sliding thereon.

The invention seeks to provide the foregoing and other advantages by providing a baby support including a yoke of unitary construction comprising a pair of relatively thickened unyielding forked arms, resiliently deformable wings constituted by progressively attenuated extensions of said arms, a flexible strap constituted by an attenuated extension of one of said wings; said strap having a free end adapted to extend to the other of said wings to complete the said yoke; and means for capturing said free end of said strap in its yoke-completing position.

A preferred embodiment of the invention will now be described, by way of example only, with reference to the following drawings in which like reference devices refer to like parts thereof throughout the several views, and in which, FIG. 1 is a perspective view of the support showing a baby held in position therein, FIG. 2 is a side elevational view of the support, FIG. 3 is an enlarged perspective view of the yoke in isolation, FIG. 4 is a plan view of the yoke shown in FIG. 3, FIG. 5 is a section of an arm of the yoke along the line 5—5 of FIG. 4, FIG. 6 is a section of a wing of the yoke along the line 6—6 of FIG. 4, FIG. 7 is a section of the strap of the yoke along the line 7—7 of FIG. 4.

The present exemplary embodiment of the invention is shown generally in FIGS. 1 and 2 and it will be seen to be comprised of a base B made up of the rigid rectangular frame 10 supporting a floor 12 having a rippled or corrugated surface providing traction to prevent the baby from slipping thereon.

The yoke Y of the present invention is carried on the free end 14 of the rigid gooseneck 16 which is rooted by its other end on a peripheral part of frame 10; said gooseneck 16 being produced from its point of attachment or rooting to locate said yoke Y at an elevation over base B. This positioning of the yoke Y and its supporting gooseneck 16 as herein visualized combine and co-operate to locate the baby away from obstructions, to render it maximally accessible for washing or other like attentions and, at the same time, to endow the present structure with requisite stability without burdening the use thereof.

It will be seen from FIGS. 3 and 4 that the said yoke Y is a unitary structure comprising the relatively thickened and hence unyielding forked arms 18—18', which are extended and progressively attenuated to form the resiliently deformable lateral wings 20—20' which are aranged to partially embrace the infant occupant of said yoke Y. A wing 20 is further extended and attenuated to provide the flexible strap 22 which is of sufficient length to extend to the other wing 20' at least and thus to complete the encirclement of the baby, as shown in FIG. 1; the strap 22 being adapted to be captured by the other wing 20' to complete the yoke Y. For this purpose, the wing 20' has the buckle-like device shown in FIG. 3 which consists of an opening 24 traversed and divided by a bar 26 in a well known manner.

The thickening of the forked arm 18 which has an important function in providing the requisite rigidity to the yoke Y is also utilized for the purpose of providing a sturdy connection with the gooseneck 16 whereby to maintain the yoke Y in a fixed orientation over the base B. To effect such a connection the convex or outer side of the forked arms 18 is provided with a boss 28 of substantial size which is socketed for the reception of the free end 14 of the gooseneck 16.

Having now fully described the individual parts of the yoke Y it will of course be understood, and it is so shown in the accompanying illustrations, that the transition from the arms 18 to the wings 20, and then to the strap 22 is neither abrupt nor well defined; the several members merging from one to another progressively, rather as a whip may taper from its stiff handle to its flexible end. The respective areas of the yoke Y are however given different names to differentiate between their varying functions and characteristics; these variations being of significant importance in the present invention.

The yoke Y of the present embodiment is as stated formed in one piece and it will be seen that the only joint in the whole device is at the strap-capturing means. It is further characterized by a rounded cross-section, at least at its edges, throughout its length, as will be seen from the sectional views of FIGS. 5, 6 and 7, and further that it is capable of making a snug and comfortable fit around the body of the baby in particular without chaffing or irritation, and of being adaptable to suit wide variations in size with the minimum loss of fitting, and while affording maximum access to the baby in all cases. In addition to these foregoing advantages, some of which might possibly be incorporated in a simple flexible belt, it also incorporates a certain degree of stability and safety. The thickened arms 18 and the resilient wings 20 to a large extent prevent the baby from making excessive movement, and at the same time protect the baby from injury whether by incautious tightening or otherwise.

Still further, the one-piece smooth construction of the yoke Y involves the minimum of crevices such as might harbour infection, whereby the safety of the whole support is enhanced.

From the foregoing description it will be seen by those skilled in the art that the yoke Y of the present exemplary embodiment is particularly suitable for manufacture out of an elastomeric material such as rubber or a so-called "plastic," of which there are many from which it could be advantageously made.

In fact the yoke Y of this embodiment is preferably moulded of a suitably plasticised polyethylene. This choice of material and method of manufacture is particularly preferred since it enables a yoke Y to be made which incorporates all of the desired features enumerated relatively economically and is, at the same time, relatively inert chemically and durable. However, it is neither intended nor desired to restrict the scope of the invention to any one material for the yoke Y, nor for any part, and the choice thereof must depend upon the particular circumstances.

In use, the strap 22 is held free as shown in FIG. 3 and the baby may be seated on the flexible sheet 12 of the base B with its back against the forked arms 18—18' and with the wings 20—20' extending around its body. The strap 22 is then passed in front of the baby and through the slots 24, around the bar 26, as shown in FIG. 2 and the baby will then be secured in the position shown in FIG. 1.

The foregoing description is of a preferred embodiment of the invention and is by way of example only. It is not thereby intended to limit the invention to such embodiment and the claims are intended to include any alterations or modifications of the invention as come within the spirit thereof.

What I claim as my invention is:

1. A baby support including a base comprising a rigid frame having a floor with a traction surface; a gooseneck rooted by one of its ends to said frame, and a yoke of unitary construction engaged and supported by the free end of said gooseneck at an elevation over said base for embracing and securing a baby comprising a pair of relatively wide thickened unyielding forked arms having inner and outer sides; said inner side being shaped to conform to and support the back of a baby; a boss formed on the outer side of said arms at the juncture thereof providing the thickening thereof as aforesaid and being socketed for the reception of the free end of said gooseneck for supporting said yoke as aforesaid; resiliently deformable wings both narrower and thinner than said arms constituted by progressively attenuated extensions thereof shaped to conform to and partially embrace the body of said baby; a flexible strap both narrower and thinner than said wings constituted by an attenuated extension of one of said wings; said strap having a free end adapted to extend to the other of said wings around the body of said baby to complete the said yoke, and an integral buckle formed on the other of said wings for capturing the free end of said strap as aforesaid.

2. A baby support including a base; a goose-neck rooted by one of its ends to a peripheral part of said base, and a yoke of unitary construction for embracing and securing a baby engaged and supported by the other end of said gooseneck at an elevation over said base and at a fixed orientation maintaining said baby free from obstruction; said yoke consisting of a pair of relatively wide thickened unyielding forked arms shaped to conform to and support the back of the baby; resiliently deformable wings both narrower and thinner than said arms constituted by progressively attenuated extensions of said arms shaped to conform to and partially embrace the body of said baby; a flexible strap both narrower and thinner than said wings constituted by an attenuated extension of one of said wings; said strap having a free end adapted to extend to the other of said wings around the body of said baby to complete the said yoke; and means for securing said free end of said strap in its yoke-completing position.

3. A baby support as set forth in claim 2 wherein said base comprises a rigid frame having a floor with a traction surface preventing the baby from slipping thereon.

References Cited in the file of this patent
UNITED STATES PATENTS

| | | |
|---|---|---|
| 289,115 | McDonald | Nov. 27, 1883 |
| 708,902 | Musgrave | Sept. 9, 1902 |
| 842,240 | Peck | Jan. 29, 1907 |
| 1,435,425 | Smith | Nov. 14, 1922 |
| 1,463,125 | Madere | July 24, 1923 |
| 2,492,880 | Nichols | Dec. 27, 1949 |
| 2,562,628 | McPeake | July 31, 1951 |
| 2,574,442 | Turner | Nov. 6, 1951 |
| 2,594,545 | Emens | Apr. 29, 1952 |
| 2,742,036 | Montesano | Apr. 17, 1956 |